US010475096B2

(12) United States Patent
Batlle

(10) Patent No.: US 10,475,096 B2
(45) Date of Patent: Nov. 12, 2019

(54) TRIGGERS FOR AUTOMATIC PURCHASING BASED ON DYNAMIC SALES DATA

(71) Applicant: PAYPAL, INC., San Jose, CA (US)

(72) Inventor: Eduardo Batlle, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 784 days.

(21) Appl. No.: 14/924,061

(22) Filed: Oct. 27, 2015

(65) Prior Publication Data

US 2017/0116655 A1 Apr. 27, 2017

(51) Int. Cl.
*G06Q 30/06* (2012.01)
*G06Q 30/02* (2012.01)

(52) U.S. Cl.
CPC ..... *G06Q 30/0617* (2013.01); *G06Q 30/0201* (2013.01); *G06Q 30/0637* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| 6,041,308 | A | * | 3/2000 | Walker | G06Q 20/00 705/14.1 |
| 6,108,639 | A | * | 8/2000 | Walker | G06Q 10/02 705/26.2 |
| 7,386,508 | B1 | * | 6/2008 | Walker | G06Q 10/02 705/26.35 |
| 7,478,054 | B1 | * | 1/2009 | Adams | G06Q 10/10 705/26.43 |
| 2007/0021991 | A1 | * | 1/2007 | Etzioni | G06Q 10/02 705/5 |
| 2007/0267482 | A1 | * | 11/2007 | Ruckart | G06Q 20/20 235/380 |

OTHER PUBLICATIONS

Convert a Limit Order to a Market order, Patrick Rooney, available at: https://www.linkedin.com/pulse/20140912102504-15027527-convert-a-limit-order-to-a-market-order/, Sep. 12, 2014, (Year: 2014).*
Active Trader Pro User Guide v 9.6 (2010) (Year: 2010).*
Investopedia various entries.*

* cited by examiner

*Primary Examiner* — Ming Shui
(74) *Attorney, Agent, or Firm* — Haynes and Boone, LLP

(57) ABSTRACT

There are provided systems and methods for to triggers for automatic purchasing based on dynamic sales data. A user may establish preauthorization data with a service provider that indicates an item of interest that the user would like to purchase. Additionally, the user may set criteria required to be met for an automatic purchase of the item of interest by the service provider on behalf of the user. The criteria may correspond to a purchase price, date, discount, or additional information associated with the item, including inventory, purchases by friends, and other types of data. The service provider may use the preauthorization data to determine triggers that, when met, cause the service provider to purchase the item on behalf of the user. Additionally, the service provider may monitor sales data for the item and additional information until a trigger is met to cause a purchase of the item.

20 Claims, 5 Drawing Sheets

TRIGGERS FOR AUTOMATIC PURCHASING BASED ON DYNAMIC SALES DATA

TECHNICAL FIELD

The present application generally relates to trigger alerts and automatic purchasing processing based on received data and more specifically to triggers for automatic purchasing based on dynamic sales data, for example, by a service provider based on preauthorized limits set by a user.

BACKGROUND

A user may wish to purchase an item from a merchant that has a flexible pricing model, such as travel tickets and accommodations. Other "big ticket" type items may be expensive, such as televisions, computers, vehicles, furniture, etc., and the user may wish to do some comparison shopping to find the best price on the item. For example, the user may wait for a holiday sale, or may wish to see a reduction in the price. Thus, the user may have time to wait for purchase of the item instead of requiring the item immediately. However, the price for an item may also increase based on decreasing inventory levels, purchasing patterns and fluctuations by buyers, or other unpredictable sales behavior. Moreover, the user may not wish to repeatedly check the price of the item the user is purchasing in order to find the best price for the item. Thus, the user may miss out on finding the best price for the item, and may purchase the item in suboptimal conditions when the user may have been able to find a better time and/or price to purchase the item.

Figure 1:
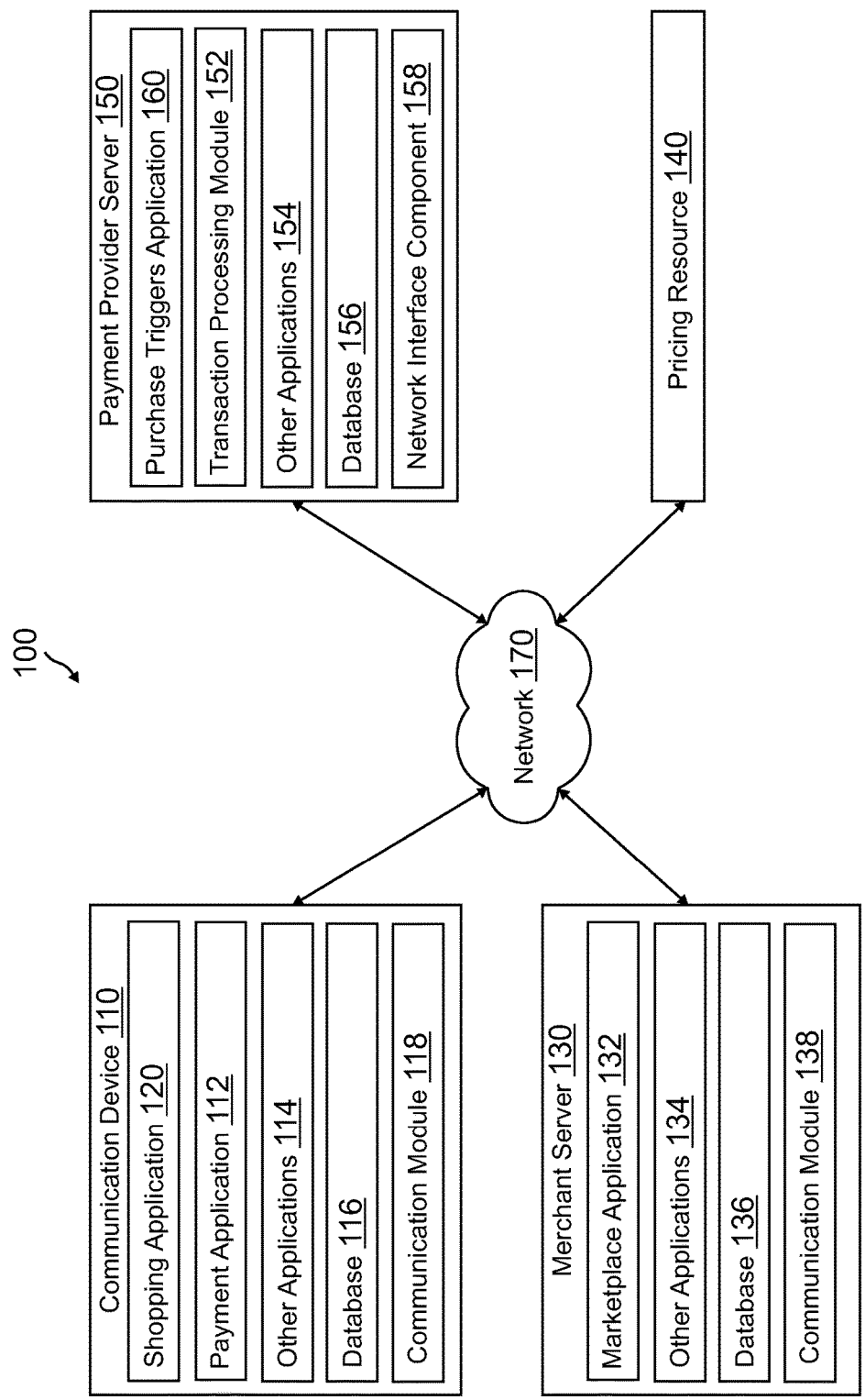
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for triggers for automatic purchasing based on dynamic sales data. Systems suitable for practicing methods of the present disclosure are also provided.

A user may utilize a device to establish preauthorization data with a service provider by accessing the service provider's system using a web browser application to access a website of the service provider or dedicated application of the service provider to login to an account with the service provider and view an application interface. The service provider may offer account services to the user and may establish an account for the user using user personal and/or financial data. The user may utilize the account to set the preauthorization data with the service provider. However, in other embodiments, an account may not be necessary to set the preauthorization data and the preauthorization data may be associated with an identifier for the user and/or device. The user may view an application interface provided through the website or dedicated application that allows the user to set the preauthorization data be entering information on a set of criteria the user would like to be met in order for the service provider to effectuate a purchase of an item of interest. Thus, the user may enter one or more items of interest to the application interface, such as through identification of the item and/or a place to purchase the item (e.g., a link to the item on a marketplace or a vendor). The user may further establish merchants selling the item and/or preferred merchants to purchase the item from, or may allow the service provider to select the merchants.

Once the user has selected the item for purchase, the service provider may request the user to enter the set of criteria required to be met for purchase of the item by the service provider. The set of criteria may correspond to one or more conditions that the user sets, which when they are met, exceeded, or otherwise satisfied, cause the service provider to effectuate a purchase of the item. The set of criteria may correspond to a purchase price of the item, such as a target price the user would like to purchase the item for. In such embodiments, the user may set the criteria as a target price, such as $200 where the item current costs $300. Thus, if the item drops to $200, the service provider may effectuate a purchase of the item, as discussed herein. The set of criteria may also correspond to an upper maximum price the user is willing to pay for the item, so that the price is not exceeded if the price of the item moves upwards instead of downwards (e.g., in the case of event tickets, travel and accommodations, valuables and collector items, etc.). The set of criteria may also correspond to a final purchase date or a timeline that the user may require the item before or by. For example, the user may wish to vacation of June $1^{st}$, and wish to have all accommodations and travel plans completed by May $15^{th}$. Thus, the user may set May $15^{th}$ as the final date by which an item related to travel or accommodations (e.g., plane tickets and/or a hotel room) must be purchased by. In such embodiments, the user may further specify a target price and/or an maximum price, so that if the current price of the item does not fall to the target price by the established final purchase date, the service provider may still process a purchase of the item for the current price, as long as the current price does not exceed the maximum price specified by the user.

The set of criteria may also include one or more additional factors, conditions, and/or settings by the user. For example, in addition to a purchase price and/or a purchase date of the item, the set of criteria may also correspond to one or more of an amount or percentage of a price change for the item, inventory levels for the item, a number of purchases of the item, a fluctuation amount of percentage in the number of purchases of the item, an amount in an account of the user, a percentage discount for purchase of the item, search results for the item, a number or percentage of online search engine searches for the item, news associated with the item, online postings and social networking trends associated with the item, microblogging trends associated with the item. In this regard, the user may make further selections of important criteria to be met that may cause the service provider to purchase the item from one or more merchants. The user may establish the set of criteria to be different with each merchant and/or for various types of merchants offering the item for sale. For example, the user may set a higher price for the same plane tickets to a vacation destination with a more favorable airline than another airline (e.g., if the user has airline miles to reduce the cost of the ticket, pay for the ticket, or receive a free upgrade in flight class). In other embodiments, the user may establish multiple similar items with different sets of criteria that are required to be met for purchase of the item. However, the user may require only one of the items to be purchased when their criterion meets the current sales (e.g., price, discount, etc.) and/or additional information (e.g., date, time, searches, etc.) meets the criteria. For example, the user may wish to purchase a laptop computer from multiple vendors but only one laptop overall, and have purchase prices for a general or specific laptop that the user would like. Thus, when one laptop's current price meets the set of criteria, the laptop may be automatically purchased and the rest of the items with matching criteria may be invalidated.

The user may select the set of criteria from menu options provided by the service provider, such as drop down menus, enterable fields, and/or other configurable states within an application interface. The fields may further include merchants selectable by the user. However, in other embodiments, the user may enter the data for the criteria themselves, which may be processed and/or confirmed by the service provider. For example, the user may provide a website address for a merchant where the service provider may find the item of interest from. In other embodiments, the user may enter other identifiers or distinguishing information that allows the service provider to identify the item of interest and/or the criteria required for purchase of the item by the service provider.

The user may further specify whether each criterion within the set of criteria is required and/or optional for purchase of the item. For example, the user may require a purchase by May 1 at or below $200, but accept any purchase made before May 1 at or below $300, and accept any purchase after May 1 at or below $400. Thus, the set of criteria may be scaling, such as a $200 price before April 1, while a $300 price before May 1. Additionally, the user may establish the set of criteria as allowing an immediate purchase and may be mandatory for purchase of the item. However, other criterion of the set of criteria may be optional, and instead of causing a purchase of the item, may instead alert the user about current sales and/or additional information for the item. For example, the user may set a criterion for purchase of the item at $300 that may be optional. Thus, when the criterion is met, the user may be alerted, such as through SMS text or email to a user's mobile device or smart phone, so that the user may choose to purchase the item if the user would like to purchase at $300. In such embodiments, if the user effectuates a purchase at the optional criteria, the service provider may cancel the item and the set of criteria.

Once the item(s) of interest and their corresponding set of criteria required for purchase of the item(s) are set, the user may exit the service provider's application interface. The item(s) and corresponding criteria may be stored by the service provider for use by the service provider. The user may leave after establishing the preauthorization data having the item(s) and corresponding criteria or the user may come back and adjust settings at a later time. For example, the user may later come back to the service provider and may adjust and/or delete the item(s) and/or one or more of the set of criteria for each item. In such embodiments, the user may delete or adjust a criteria, such as when a user believes a criteria may not be fulfilled. Thus, if the user believes that a price for an item may not be met, the user may adjust the item so that the new criteria may be met.

The preauthorization data (e.g., information for the item of interest and the set of criteria required for automatic purchase of the item of interest by the service provider) may be used to determine one or more triggers that cause a purchase of the item of interest by the service provider on behalf of the user. The triggers may correspond to a data point where reached, exceeded, passed, or otherwise met, may cause the service provider to effectuate a purchase of the item for data matching the data point that is met. For example, a trigger determined based on the criteria may correspond to an automatic purchase when an item is priced below $200 based on a user establishing $200 as the criteria to effectuate purchase of the item by the service provider. Thus, the service provider may determine the triggers so that, when data is received, scraped, or otherwise determined, the service provider may purchase the item for the determined data. In this regard, the triggers may correspond to one or a plurality of data points, such as just a price, or a price by a certain date, a price based on a number of similar purchases by friends, or other combination of the aforementioned set of criteria the user may establish for an item. The triggers may correspond to mandatory triggers required to be met in order to effectuate a purchase. However, in other embodiments, where the user sets optional criteria to be met by the service provider, the triggers may instead correspond to optional triggers, which may cause an alert to be generated by the service provider and communicated to the user.

Once the preauthorization data is established with the service provider, the service provider may retrieve sales data on an item of interest. The sales data may be retrieved continuously or periodically, such as at specified intervals (e.g., every minute, hour, day, week, etc.). The sales data may include a price for the item, a discount for the item, a price change for the item, and/or an inventory level for the item. The sales data may be retrieved from one or more merchants, which may be specified by the user. The sales data may be used to determine whether one or more of the set of criteria is met by matching the sales data to the triggers determined by the service provider. Additionally, the service provider may process additional information with the sales data to determine whether the triggers have been met. The additional information may correspond to a date, a time, search engine information associated with the item, social networking information associated with the item, news associated with the item, and/or investment information associated with the item. The additional information may be received, pulled, scraped, or otherwise determined from one or more other resources, including a database of the service provider and/or other online or network accessible resources (e.g., other devices, services, sensors, etc.).

If the service provider determines one or more of the triggers to cause a purchase of an item of interest are met based on the determined sales data and/or additional information, the service provider may cause an automatic purchase of the item of interest. The purchase may be done without consent of the user based on the user's previous consent provided with the preauthorization data. However, in other embodiments, the user may be alerted of the purchase and approval may be requested. The service provider may provide a payment to a merchant offering the item of interest for sale for purchase information matching the one or more triggers determined by the service provider using the set of criteria. In various embodiments, the payment may be provided using a payment account of the user, or other accessible payment instrument, including credit/debit cards, bank accounts, etc. However, in other embodiments, an amount of credit may be extended to the user to provide the payment, and the user may later reimburse the service provider. Additionally, to protect from fraud, the service provider may also require the user to provide deposit amount on establishment of the preauthorization data that may be held by the service provider to provide the eventual payment. Once a payment is completed, the service provider may assist in providing the item to the user, for example, using shipping, digital transaction receipts, etc.

Where the service provider determines an optional trigger has been met, the service provider may instead generate one or more alerts to the user to purchase the item for the optional purchase information matching the optional trigger. In such embodiments, the alert may be viewed by the user and the user may approve or decline a purchase of the item. Where the user approves a purchase of the item for purchase information (e.g., price, date, discount, etc.) information matching the optional trigger, the service provider may cancel the further mandatory triggers and process a payment to the merchant in order to purchase the item for the purchase information. Additionally, the service provider may provide intelligent purchasing if sales data cannot be reached by deadline or other requirement for purchase. In such embodiments, the service provider may determine a lowest likely price (e.g., a price near a lowest amount over a time period) that the item is selling for prior to a required date for purchase by the user. Thus, the service provider may then purchase the item for the lowest likely price even where the lowest likely price is not the required criteria by the user.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user, a communication device 110, a merchant server 130, a pricing resource 140, and a payment provider server 150, in communication over a network 170. A user (not shown) may utilize communication device 110 to establish preauthorization data with payment provider server 150 that authorizes payment provider server 150 to purchase an item of interest that the user wishes to purchase when sales and/or additional information for a purchase of the item matches a set of criteria established by the user. Payment provider server 150 may store the preauthorization data and may determine one or more mandatory triggers that, when met, cause a purchase of the item by payment provider server 150 on behalf of the user. Payment provider server 150 may use a payment account for the user with payment provider server 150, and/or may hold an amount of money aside (e.g., in escrow) until purchase of the item. Payment provider server 150 may retrieve sales data from merchant server 130 to determine when to purchase the item, and may purchase the item from merchant server 130. Additionally, pricing resource 140 may be used to determine other sales data, additional information, and/or other relevant information that may cause a trigger to be met.

Communication device 110, merchant server 130, pricing resource 140, and/or payment provider server 150, and telecommunication carrier server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with merchant server 130 and/or payment provider server 150. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a shopping application 120, payment application 112, other applications 114, a database 116, and a communication module 118. Payment application 112, other applications 114, and other applications 114 may correspond to executable processes, procedures, and/or applications with associated hardware. In other embodiments, communication device 110 may include additional or different modules having specialized hardware and/or software as required.

Shopping application 120 may correspond to one or more processes to execute software modules and associated devices of communication device 110 to establish preauthorization data with payment provider server 150 having a set of criteria for purchase of an item of interest, and view purchased items, item alerts, and/or adjust the criteria for the item of interest. In this regard, shopping application 120 may correspond to specialized hardware and/or software utilized by a user of communication device 110 to access an application interface provided by payment provider server 150, as discussed herein. The application interface may be retrieved from a website of payment provider server 150, or may be accessible through a dedicated application making an application programming interface (API) call to payment provider server 150 to retrieve data necessary to present the application interface through the dedicated application.

Thus, shopping application 120 may correspond to a web browser in various embodiments, or may correspond to a dedicated application of payment provider server 150 that include pre-stored and/or pre-generated application interfaces, which may present data retrievable from payment provider server 150 after one or more API calls.

The application interface displayed by shopping application 120 on an output display device of communication device 110 may allow a user (not shown) of communication device 110 to set preauthorization data having a set of criteria of item sales and/or purchase information for an item of interest that the user would like payment provider server 150 to automatically purchase on behalf of the user. In this regard, the user may first enter an item of interest, which may be selected through one or more menu options (e.g., drop down menu, selectable options, navigation of a marketplace of items, etc.). In other embodiments, the user may enter in an online location of the item, such as a webpage of an offer for sale of the item, a location of a merchant marketplace offering the item for sale, or identification of an application or other online portal offering the item for sale. Thus, the user may identify merchant server 130 as selling an item of interest, and may identify the item of interest. The user may also set a plurality of merchants offering the item of interest for sale. The user may set the item of interest as an item having a variable price (e.g., plane tickets, hotel accommodations, event tickets, collector memorabilia, etc.), or may set an item of interest with a more stable price but that may go on sale from time to time (e.g., electronics, furniture, etc.). The user may also establish similar items of interest and a number of the similar items of interest the user may wish to purchase (e.g., 5 different laptops identified as the items of interest, but only 1 laptop is authorized for purchase). Additionally, the user may also set a general category of items instead of a specific item (e.g., any laptop sold by computer manufacturer A).

Once the user has identified the item of interest, shopping application 120 may further be used to enter in the set of criteria required to be met in order for payment provider server 150 to automatically purchase the item of interest on behalf of the user. The set of criteria may correspond to information about a purchase of the item that must be met by payment provider server 150 in order for the item to be authorized for purchase on behalf of the user. Thus, the set of criteria may include a purchase price for the item, a purchase date for the item, an amount or percentage of a price change for the item, inventory levels for the item, a number of purchases of the item, a fluctuation amount of percentage in the number of purchases of the item, an amount in an account of the user, a percentage discount for purchase of the item, search results for the item, a number or percentage of online search engine searches for the item, news associated with the item, online postings and social networking trends associated with the item, and/or microblogging trends associated with the item. The set of criteria may also include a combination of the aforementioned elements, such as a price below $200 before May 1. Thus, after May 1, the user may no longer authorize purchase of item. The user may also establish scaling criteria, such as a purchase below $200 before May 1 and a purchase below $300 after May 1. The set of criteria may be related to purchase information in a transaction for the item (e.g., price, date, discount, etc.) with merchant server 130, and may also be related to additional information (e.g., a number of search engine searches, friend purchases, etc.). The user may establish the set of criteria differently for related items where only one purchase is required, such as laptop A under $200 and laptop B under $300. In various embodiments, the set of criteria may also include optional criteria that instead cause an alert of the current item information to the user, such as a pricing alert, a current date alert, or other alert the user would like to establish. Once the preauthorization data is established by the user having the item(s) of interest and their corresponding set of criteria required for purchase of the item by payment provider server 150, the preauthorization data may be communicated to payment provider server 150 by shopping application 120.

Additionally, shopping application 120 may be used to view the results of preauthorization data, such as purchased items by payment provider server 150 on behalf of the user using the preauthorization data. Shopping application 120 may therefore retrieve purchased item data and display the information to the user through an application interface. Shopping application 120 may also display alerts for optional criteria determined by payment provider server 150, as discussed herein. Where the user may wish to purchase an item based on an alert communicated to shopping application 120, the user may utilize shopping application 120 with payment application 112 to effectuate the purchase.

Payment application 112 may correspond to one or more processes to execute software modules and associated devices of communication device 110 to enter one or more payment instruments or other funding sources for storage in a digital wallet associated with a payment account (e.g., stored and/or serviced by payment provider server 150) and access the digital wallet and/or payment account for use. In this regard, payment application 112 may correspond to specialized hardware and/or software utilized by a user of communication device 110 that provides an interface to permit the user to enter input and other data for payment instruments, for example, through an input device (e.g., touch screen with a graphical user interface displayed by payment application 112, keypad/keyboard, mouse, etc.) and/or through a data capture device (e.g., scanner, camera, other optical device, etc.) In various embodiments, information for the payment account may also be stored to communication device 110 for use in an offline environment. The payment account accessible through payment application 112 may be used to initiate, receive, and/or process/complete transactions using services provided by payment provider server 150. The transactions may correspond to preauthorization data set by the user for one or more items of interest. In this regard, the user may approve a purchase amount for the item(s) of interest using payment application 120, and may provide a payment source associated with the payment account for payment of the purchase amount. Where payment provider server 150 sets the purchase amount aside (e.g., in escrow or otherwise held in an account for later payment), payment application 112 may be used to provide the payment amount to payment provider server 150, for example, by approving a withdrawal of the amount from a payment instrument (e.g., the payment account or a payment instrument associated with the payment account).

Once entered, the payment instruments may be communicated to payment provider server 150 over network 170 by payment application 112 for establishment and/or maintenance/update of the payment account and/or entry into the digital wallet. Moreover, the user may further enter data for data usage accounts for the user to payment application 112 for storage with the payment account. The user of communication device 110 may also enter benefits to payment application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons.

Payment application 112 may be implemented as a user interface enabling the user to select and provide payment options for voice data transfers. In various embodiments, payment application 112 may include a general browser application configured to retrieve, present, and communicate information over the Internet (e.g., utilize resources on the World Wide Web) or a private network. For example, payment application 112 may provide a web browser, which may send and receive information over network 170, including retrieving website information (e.g., a website for payment provider server 150), presenting the website information to the user, and/or communicating information to the website, including payment information for payment through payment provider server 150. However, in other embodiments, payment application 112 may include a dedicated application of payment provider server 150 or other entity (e.g., a merchant), which may be configured to assist in processing purchase requests. As discussed herein, payment application 112 may utilize user financial information, such as a credit card, bank account, or other financial account, as a payment instrument when providing payment information. Additionally, payment application 112 may utilize a user account with payment provider, such as payment provider server 150, as the payment instrument.

One or more of the aforementioned features and/or processes of shopping application 120 may be included within payment application 112 or vice versa, for example, to provide their respective features within one application and/or application interface.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications. Other applications 114 may also include other location detection applications, which may be used to determine a location for the user, such as a mapping, compass, and/or GPS application, which can include a specialized GPS receiver that obtains location information for communication device 110 and processes the location information to determine a location communication device 110 and the user. Other applications may include social networking applications, media viewing, and/or merchant applications.

Other applications 114 may also be associated with other devices, such as biometric devices and other types of accessible or connected devices. Other applications 114 may be utilized by other applications 114 to determine user data or other information, which may be communicated to payment provider server 150. Thus, other applications 114 may collect, capture, and/or otherwise determine user data and other information for the user, which may be used to determine where to allocate cost for a voice data transfer. Other applications 114 may include device interfaces and other display modules that may receive input from the user and/or output information to the user. For example, other applications 114 may contain software programs, executable by a processor, including a graphical user interface (GUI) configured to provide an interface to the user. Other application may therefore use device of communication device 110, such as display devices, including GUI's capable of displaying information to users and other output devices, including speakers. Communication device 110 may include input devices, including touch screens. Communication device 110 may include a sensor or other component used to collect the current information associated with the user, such as an input device, a camera, a microphone, an accelerometer, a motion detector, an environmental sensor, and/or a biometric sensor.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment application 112 and/or other applications 114, identifiers associated with hardware of communication device 110, or other appropriate identifiers, such as identifiers used for payment/user/device authentication or identification, which may be communicated as identifying communication device 110 to payment provider server 150 and/or telecommunication carrier server 170. Database 116 may include information communicated to payment provider server 150, such as preauthorization data. Additionally, purchased item information, item alerts, and other receivable data from payment provider server 150 may be stored to database 116.

Communication device 110 includes at least one communication module 118 adapted to communicate with merchant device 130 and/or payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant server 130 may be implemented using any appropriate hardware and software configured for wired and/or wireless communication with communication device 110 and/or payment provider server 150. Merchant server 130 may correspond to a server or cloud computing architecture to provide sales of items, for example, through an online marketplace accessible over a network connection with merchant server 130. Merchant server 130 may further be used to process payments for items and provide sales data for the items, such as a price, discount, or other available data on the purchasing the item. Although a merchant server is shown, the merchant server may be managed or controlled by any suitable processing device. Although only one merchant server is shown, a plurality of merchant servers may function similarly.

Merchant server 130 of FIG. 1 contains a sales application 132, other applications 134, a database 136, and a communication module 138. Sales application 132 and other applications 134 may correspond to processes, procedures, and/or applications executable by a hardware processor, for example, a software program. In other embodiments, merchant server 130 may include additional or different modules having specialized hardware and/or software as required.

Sales application 132 may correspond to one or more processes to execute modules and associated specialized hardware of merchant server 130 that provide a marketplace to sell one or more items offered by a merchant (not shown) associated with merchant server 130, and further provider checkout and payment processes for a transaction to purchase the items for sale from the merchant corresponding to merchant server 130. In this regard, sales application 132 may correspond to specialized hardware and/or software of merchant server 130 to provide a convenient interface to permit a merchant offer items for sale. For example, sales application 132 may be implemented as an application offering items for sale that may be accessed by communication device 110 to present the items for sale to the user associated with communication device 110. In certain embodiments, sales application 132 may correspond to a website available over the Internet and/or online content and/or database information accessible through a dedicated application. Thus, sales module 160 may provide item sales through an online marketplace using the website of the merchant In addition to providing the marketplace for item for sale by merchant server 130, sales application 132 may further be used to determine and/or provide sales information on the sale of the item(s) offered by the merchant. For example, sales application 132 may include information for a price for the item, a discount for the item, a price change for the item, and an inventory level for the item. The information may be based updated periodically or continuously, such as in real time and information for the item(s) for sale changes. The information may be used in a purchase of the item(s) by another entity, such as the user corresponding to communication device 110 and/or payment provider server 150 on behalf of the user. Additionally, the sales data and other item data may be retrievable by payment provider server 150, such as requestable through an API call, retrievable from a database, and/or scrapped from an online resource. The information may be used to generate a transaction to purchase the item(s).

Thus, sales application 132 may be used to establish a transaction once the user associated with communication device 110 has selected one or more items for purchase. Once a payment amount is determined for the transaction for the item(s) to be purchased by user 102, sales application 132 may request payment from user 102. Sales application 132 may receive payment processing information, such as a payment and a receipt. The payment request may be authorized by payment application 112 of communication device 110. In such embodiments, the payment request may be processed, payment provided to the merchant account, and notification of payment (or failure, for example, where there are insufficient user funds) may be sent to sales application 132. The payment may be made by payment provider server 150 on behalf of the user associated with communication device 110. Sales application 132 may then receive the results of the transaction processing, and complete the transaction with user 102, for example, by providing the user the items for the transaction or declining the transaction where user 102 is not authenticated or the transaction is not authorized (e.g., insufficient funds).

Merchant server 130 includes other applications 134 as may be desired in particular embodiments to provide features to merchant server 130. For example, other applications 134 may include security applications for implementing server-side security features, programmatic client applications for interfacing with appropriate application programming interfaces (APIs) over network 150, or other types of applications. Other applications 134 may also include email, texting, voice and IM applications that allow a user to send and receive emails, calls, texts, and other notifications through network 150. In various embodiments, other applications 134 may include financial applications, such as banking, online payments, money transfer, or other applications associated with payment provider server 150. Other applications 134 may contain software programs, executable by a processor, including a graphical user interface (GUI) configured to provide an interface to the user.

Merchant server 130 may further include database 136 which may include, for example, identifiers such as operating system registry entries, cookies associated with sales application 132 and/or other applications 134, identifiers associated with hardware of merchant server 130, or other appropriate identifiers, such as identifiers used for payment/user/device authentication or identification. Identifiers in database 136 may be used by a payment/credit provider, such as payment provider server 150, to associate merchant server 130 with a particular account maintained by the payment/credit provider. Item and sales information for items sold by the merchant associated with merchant server 130 may be stored to database 136. Database 136 may further include transaction information and/or results, including transaction histories.

Merchant server 130 includes at least one communication module 138 adapted to communicate with communication device 110 and/or payment provider server 150. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Pricing resource 140 may correspond to an online resource used to determine a real or potential price from an item, or otherwise influence sales and/or additional data for the item in order to determine whether requirements in a set of criteria for purchase of an item of interest has been met. In this regard, pricing resource 140 may correspond to a network accessible device, server, sensor, or other data point, which may include cloud computing architecture, which may provide data related to an item. In various embodiments, pricing resource 140 may correspond to a social networking, microblogging, media sharing, search engine, or other online resource, which may provide additional information, such as a date, a time, search engine information associated with the item, social networking information associated with the item, news associated with the item, and/or investment information associated with the item. However, more conventionally, pricing resource 140 may correspond to a merchant, marketplace, discount provider, or other sales entity, which may provide sales data related to an item. Pricing resource 140 may be utilize by payment provider server 150 to determine whether one or more triggers based on preauthorization data have been met.

Payment provider server 150 may be maintained, for example, by an online payment service provider, which may provide payment services and/or processing for financial transactions on behalf of users. In this regard, payment provider server 150 includes one or more processing applications which may be configured to interact with communication device 110, merchant server 130, pricing resource 140, and/or another device/server to facilitate payment for a voice data transfer, including establishment of payment accounts and assigning responsibility of payment for a voice data transfer to one or more users. In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide payment services to the user.

Payment provider server 150 of FIG. 1 includes a purchasing triggers application 160, a transaction processing application 152, other applications 154, a database 156, and a network interface component 158. Purchasing triggers application 160, transaction processing application 152, and other applications 154 may correspond to executable processes, procedures, and/or applications with associated hardware. In other embodiments, payment provider server 150 may include additional or different modules having specialized hardware and/or software as required.

Purchasing triggers application 160 may correspond to one or more processes to execute software modules and associated specialized hardware of payment provider server 150 to determine one or more mandatory triggers causing purchase of an item of interest on behalf of the user associated with communication device 110 using preauthorization data set by the user. In this regard, purchasing triggers application 160 may correspond to specialized hardware and/or software to access the preauthorization data set by the user corresponding to communication device 110 using shopping application 120 of communication device 110. As discussed herein, the preauthorization data may correspond to an item of interest that the user wishes to purchase. Moreover, the preauthorization data may further include the set of criteria used to determine when and where (e.g., what merchants) to purchase an item of interest from. Purchasing triggers application 160 may determine the mandatory trigger(s) for the item of interest using the set of criteria by generating a trigger for each criterion or multiple criteria that are required to be met in order to purchase the item on behalf of the user. For example, if one criterion for an item is less than $200, a trigger may be set to purchase the item when it is lower than $200. However, if the criteria is less than $200 and before May 1, the trigger will include both of the aforementioned criteria. Moreover, multiple triggers may be made where the set of criteria may stipulate multiple satisfaction conditions causing purchase of the item. For example, if less than $200 and before May 1 may be satisfied or anytime less than $100, multiple triggers may be made than may otherwise be satisfied to determined when to purchase an item.

Additionally, purchasing triggers application 160 may determine any optional triggers that may cause an alert of the current sales or additional information for the item to be generated. For example, the user associated with communication device 110 may establish certain criterion of the set of criteria to be optional but would like to be alerted of their existence. An exemplary optional criterion may correspond to a price below $300, where the user may wish to be alerted of the price below $300 to consider whether to purchase the item. However, the user may only wish to consider the purchase and does not preauthorize an automatic purchase. Thus, purchasing triggers application 160 may determine one or more optional triggers, which may not be linked to an automatic purchase of the item, and may instead alert the user when the optional trigger is met.

Once mandatory and/or optional triggers for an item of interest have been determined by purchasing triggers application 160, purchasing triggers application 160 may further monitor sales data and additional information to determine whether one or more of the triggers have been met. Sales data and additional information may be receivable from merchant server 130, pricing resource 140, and/or other online resources. Purchasing triggers application 160 may utilize the received, scraped, requested, or otherwise retrievable information to match the information to the mandatory and/or optional triggers. Where only an optional trigger is met, purchasing triggers application 160 may be used the information to generate an alert to communication device 110 having information about the current sales data or additional information related to the item of interest. The alert may include an option to purchase the item of interest by the user using payment application 112. However, where a mandatory trigger for purchase of the item of interest is met, purchasing triggers application 160 may cause a purchase of the item of interest from a merchant providing sales data for the item of interest that may cause a transaction to be generated having purchase information of the item of interest matching the set of criteria for the mandatory trigger. For example, the merchant associated with merchant server 130 may offer the item of interest for $190 when the mandatory trigger is $200. Thus, purchasing triggers application 160 may determine that the trigger has been met with merchant server 130 and may automatically (e.g., without user consent) cause a purchase request for the item of interest to be generated. The purchase request may be resolved using transaction processing application 152 to provide a payment to the merchant.

Transaction processing application 152 may correspond to one or more processes to execute software modules and associated specialized hardware of payment provider server 150 to establish, maintain, and provide a payment account to a user based on entered payment instruments, or other funding sources by the user. In this regard, transaction processing application 152 may correspond to specialized hardware and/or software to receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account, for example, payment for a voice data transfer. The user may also provide information for the payment instruments, for example, through one or more input devices of communication device 110. Once entered, the payment account may be established. Transaction processing application 152 may further allow the user to service and maintain the digital wallet, for example, by adding and removing payment instruments. The funding instruments may include credit cards, debit cards, bank accounts, funds in a brokerage account, electronic payment accounts, merchant credit accounts, gift cards, coupon codes, discount codes, rewards accounts, and available cash-back from at least one rewards account.

Transaction processing application 160 may receive a purchase request from purchasing triggers application 160, as discussed herein. Transaction processing application 160 may be used to provide a payment for an item of interest to a merchant, such as merchant server 130, when a purchasing trigger is met, such as a mandatory trigger causing automatic purchase of the item. Transaction processing application 160 may debit an account of the user automatically and provide the payment to an account of the merchant. However, in other embodiments, on establishment of a set of criteria for purchase of an item, transaction processing application 160 may automatically debit the account of the user a preauthorized amount for the transaction. Transaction processing application 160 may then use this amount to pay the seller merchant, and may credit any remaining balance back to the account of the user.

In various embodiments, payment provider server 150 includes other applications 154 as may be desired in particular embodiments to provide features to payment provider server 134. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to the user when accessing payment provider server 134, where the user or other users may interact with the GUI to more easily view and communicate information. In various embodiments, other applications 154 may include connection and/or communication applications, which may be utilized to communicate information to over network 170.

Additionally, payment provider server 150 includes database 156. As previously discussed, the user and/or the merchant corresponding to telecommunication carrier server 170 may establish one or more digital wallets and/or payment accounts with payment provider server 150. Digital wallets and/or payment accounts in database 156 may include user information, such as name, address, birth date, payment instruments/funding sources, additional user financial information, user preferences, and/or other desired user data. Users may link to their respective digital wallets and/or payment accounts through an account, user, merchant, and/or device identifier. Thus, when an identifier is transmitted to payment provider server 150, e.g. from communication device 110, one or more digital wallets and/or payment accounts belonging to the users may be found. Database 156 may also store the preauthorization data for a user and their account, as well as any triggers determined using the preauthorization data. Any sales data and/or additional information used to determine whether a trigger has been met and receivable from one or more resources may also be stored to database 156.

In various embodiments, payment provider server 150 includes at least one network interface component 158 adapted to communicate with communication device 110, merchant server 130, and/or pricing resource 140 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
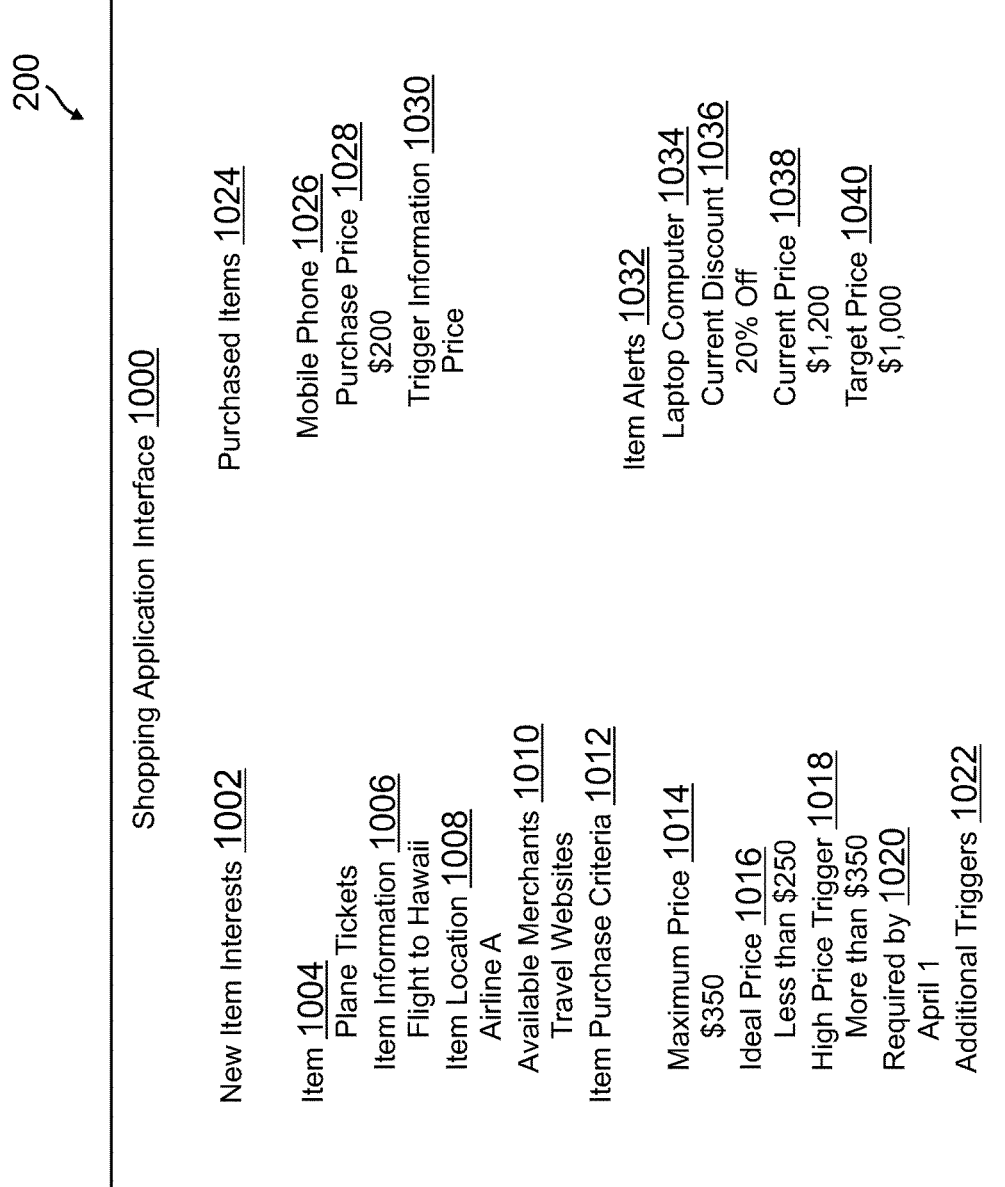
FIG. 2 is exemplary interface displayed in a shopping application of a device and used to establish preauthorization data to purchase items and view items purchased based on the preauthorization data, according to an embodiment.

FIG. 2 is exemplary interface displayed in a shopping application of a device and used to establish preauthorization data to purchase items and view items purchased based on the preauthorization data, according to an embodiment. Environment 200 includes a shopping application interface 1000 displayed on a communication device corresponding generally to the devices and applications described in reference to environment 100 of FIG. 1. Thus, shopping application interface 1000 may correspond generally to graphical user interfaces displayed on an output display device, which may display information processed by shopping application 120.

In this regard, shopping application interface 1000 displays an exemplary interface that may be used for establishment of preauthorization data and viewing of purchased items and item alerts based on the preauthorization data by a user. Shopping application interface 1000 is shown with new item interests 1002, which may be used to set a "flight to Hawaii". The user may set further criteria for item 1004, which includes item location 1008, e.g., airline A, used to identify a specific type of item (e.g., a flight with airline A). Moreover, the user may set where to purchase item 1004 under available merchants 1010, such as specifying travel websites that sell item 1004.

Once information for item 1004 has been established, the user may further set item purchase criteria 1012. Item purchase criteria 1012 may correspond to a set of criteria required to be met by a service provider to cause a purchase of item 1004. Thus, item purchase criteria 1012 includes a maximum price 1014, such as $350, which may not be exceeded by the service provider and is a maximum amount preauthorized amount by the user. Additionally, the user may set an ideal price 1016 that the user would like to purchase the item for. The user may set optional criteria, which may cause an alert to the user, under high price trigger 1018 (e.g., when the price exceeds $350, the maximum price 1014). The user may further set a date where that item 1004 must be purchased by under a "required by" 1020 option (e.g., April 1). Shopping application interface 1000 may further have additional triggers 1022, including discounts, inventory levels, or other triggering criteria.

Shopping application interface 1000 may further display received information, including purchased items 1024 and item alerts 1032. Purchased items 1024 includes a mobile phone 1026 purchased based on triggers determined using preauthorization data set by the user. Additionally, shopping application interface may display a purchase price 1028 of $200 for mobile phone 1026 and trigger information 1030 that provides information on what caused the purchase of mobile phone 1026. Item alerts 1032 may be received based on optional criteria set by the user in preauthorization data that cause an alert to the user. Thus, item alerts 1032 includes a laptop computer 1034 alert, that displays data for laptop computer 1034 causing the alert, such as a current discount 1036 of 20%, a current price 1038 of $1,200, and/or a target price 1040 $1,000.

Figure 3:
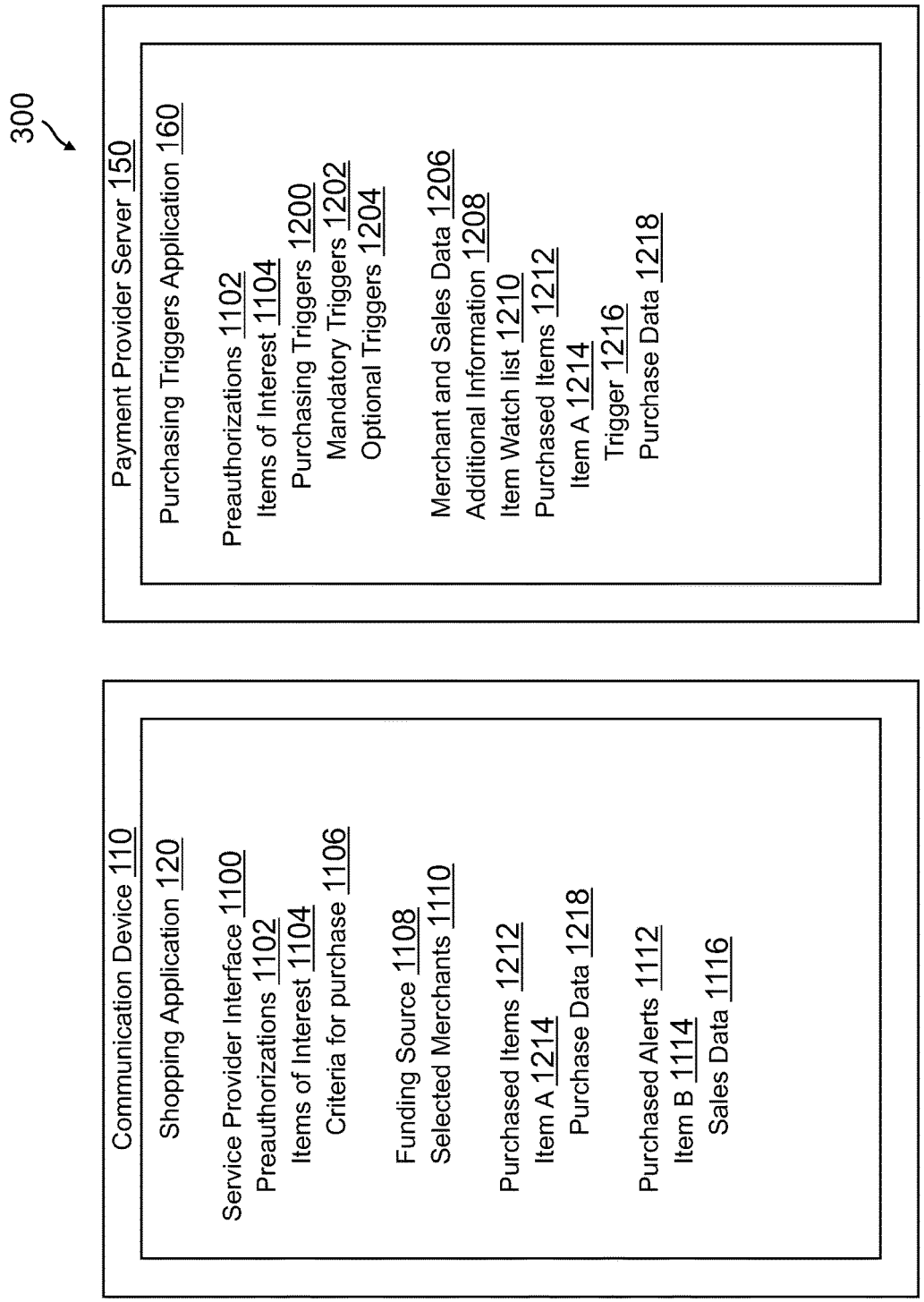
FIG. 3 is an exemplary system environment showing a device interacting with a service provider to establish preauthorization data and receive information on purchases made using the preauthorization data and alerts based the preauthorization data and available items, according to an embodiment.

FIG. 3 is an exemplary system environment showing a device interacting with a service provider to establish preauthorization data and receive information on purchases made using the preauthorization data and alerts based the preauthorization data and available items, according to an embodiment. FIG. 3 includes communication device 110 and/or payment provider server 150 all discussed in reference to environment 100 of FIG. 1.

Communication device 110 executes shopping application 120 corresponding generally to the specialized hardware and/or software modules and processes described in reference to FIG. 1. In this regard, shopping application 120 includes preauthorization data communicated to payment provider server 150. For example, shopping application 120 may include a service provider interface 1100 that may be used to enter the preauthorization data. Thus, service provider interface 1100 includes preauthorizations 1102 having items of interest 1104 with criteria for purchase 1106. Additionally, preauthorizations 1102 includes a funding source 1108 for items of interest 1104, as well as selected merchants 1110 for items of interest 1104. In various embodiments, service provider interface may also be associated with received data, including purchased items 1212 and purchase alerts 1112. Purchased items 1212 includes an item A 1214 purchased by payment provider server 150 based on preauthorizations 1102 on behalf of the user associated with communication device 110. Item A 1214 may include purchase data 1218 for display to the user. Purchase alerts 1112 may include an alert determined using preauthorizations 1102, including an alert for item B 1114, which may include sales data 1116 displayed to the user.

Payment provider server 150 executes purchasing triggers application 160 corresponding generally to the specialized hardware and/or software modules and processes described in reference to FIG. 1. In this regard, purchasing triggers application 160 includes preauthorizations 1102 received from communication device 110. Preauthorizations 1102 includes information entered to service provider interface 1100, which includes items of interest 1104. Using preauthorizations 1102 may be used to determine purchasing triggers 1200, which may include mandatory triggers 1202 causing a purchase of one or more of items of interest 1104, as well as optional triggers 1204 causing an alert to be generated to the user associated with communication device 110 for one or more of items of interest 1104. Purchasing triggers application 160 may further be used to retrieve merchant and sales data 1206 for use in determining whether purchasing triggers 1200 have been met. Moreover, additional information 1208 may also be determined or retrieved for use in determining whether purchasing triggers 1200 have been met. Using preauthorizations 1102, an item watch list 1210 may be determined for items of interest 1104, which may include alerts for items of interest 1104. Additionally, purchasing triggers application 160 may include purchased items 1212, such as item A 1214 displayed through service provider interface 1100 having a trigger 1216 and purchase data 1218.

Figure 4:
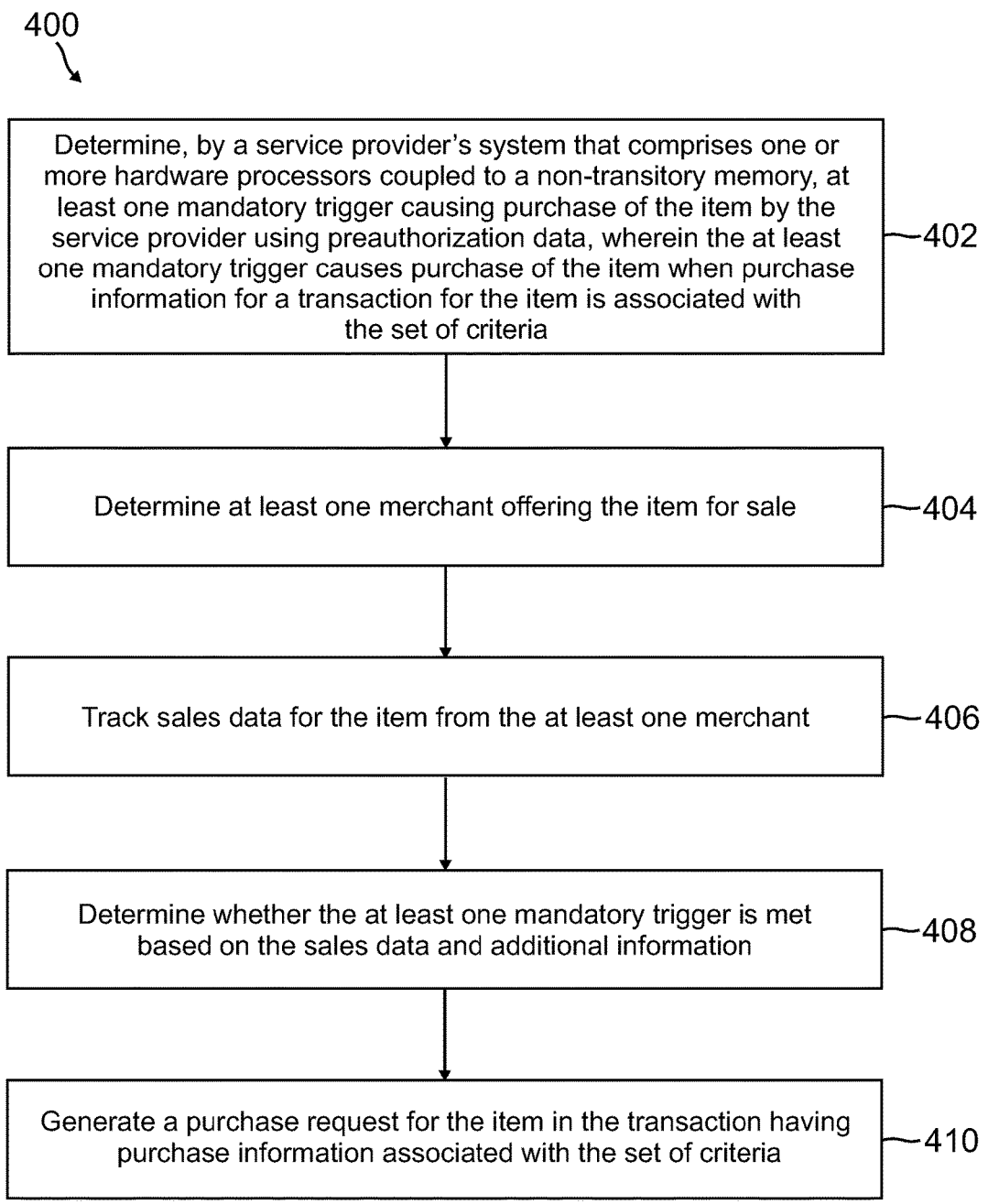
FIG. 4 is a flowchart of an exemplary process for triggers for automatic purchasing based on dynamic sales data, according to an embodiment.

FIG. 4 is a flowchart of an exemplary process for triggers for automatic purchasing based on dynamic sales data. Note that one or more steps, processes, and methods described herein may be omitted, performed in a different sequence, or combined as desired or appropriate.

At step 402, at least one mandatory trigger causing purchase of the item by the service provider using preauthorization data is determined, for example, by a service provider's system that comprises one or more hardware processors coupled to a non-transitory memory, wherein the at least one mandatory trigger causes purchase of the item when purchase information for a transaction for the item is associated with the set of criteria and purchasing trigger(s) are met. In various embodiments, the user further establishes at least one mandatory criteria of the set of criteria that cause purchase when met, wherein the at least one mandatory criteria comprises one of a first time and a first price, and wherein the at least one mandatory trigger is determined using the at least one mandatory criteria. The at least one mandatory trigger may comprise at least one limit on purchase of the item, wherein the at least one limit prevents generation of the purchase request of the at least one limit is exceeded by the sales data.

The set of criteria may comprise a purchase price for the item, a purchase date for the item, an amount or percentage of a price change for the item, inventory levels for the item, a number of purchases of the item, a fluctuation amount of percentage in the number of purchases of the item, an amount in an account of the user, a percentage discount for purchase of the item, search results for the item, a number or percentage of online search engine searches for the item, news associated with the item, online postings and social networking trends associated with the item, and/or microblogging trends associated with the item. The set of criteria may also comprise a number of purchases by other users associated with the user, and wherein the sales data comprises the number of purchases by the other users. In such embodiments, the user may be alerted of the number of purchases by the other users.

In further embodiments, the user further establishes at least one optional criteria of the set of criteria that cause alerts to the user on the sales data, and wherein the at least one optional criteria comprises one of a second time prior to the first time, a second price higher than the first price, a discount amount, a price fluctuation amount or percentage, an inventory level, and a number of purchases. In such embodiments, at least one optional trigger that causes the alerts to the user using the at least one optional criteria, the sales data, and the additional information is determined and communicated to a device for the user. In response to the user receiving the at least one optional trigger on the device, an authorization to purchase the item based on the at least one optional trigger may be received, and a purchase request is further generated using the authorization.

At least one merchant offering the item for sale is determined, at step 404. At step 406, sales data for the item from the at least one merchant is tracked. Thus, at step 408, a determination is made of whether the at least one mandatory trigger is met based on the sales data and additional information. The sales data may comprise at least one of a price for the item, a discount for the item, a price change for the item, and an inventory level for the item. The sales data may be automatically pulled from at least one merchant offering the item for sale. The additional information may comprise at least one of a date, a time, search engine information associated with the item, social networking information associated with the item, news associated with the item, and investment information associated with the item. In various embodiments, a network resource may provide one of the sales data and the additional data, wherein the network resource comprises one of a device of another user, an online database, a search engine, an online news feed, a social networking resource, a microblogging resource, and a stock market server.

A purchase request for the item in the transaction having purchase information associated with the set of criteria is generated, at step 410. In various embodiments, the purchase request may be automatically processed to provide a payment to a merchant offering the item for sale matching the purchase information without user consent based on the preauthorization data. The payment may be provided using one of credit extended to the user and payment account with the service provider. However, in other embodiments, an amount for the item to provide the payment to the merchant from the user is received on establishment of the preauthorization data, wherein the amount is held by the service provider for use in providing the payment. A non-transitory memory may store an application interface for the service provider. The application interface may be communicated to the user and the application interface may comprise options for establishment of the preauthorization data, wherein the options displayed in the application interface allow selection of the item and identification of at least one merchant selling the item.

Figure 5:
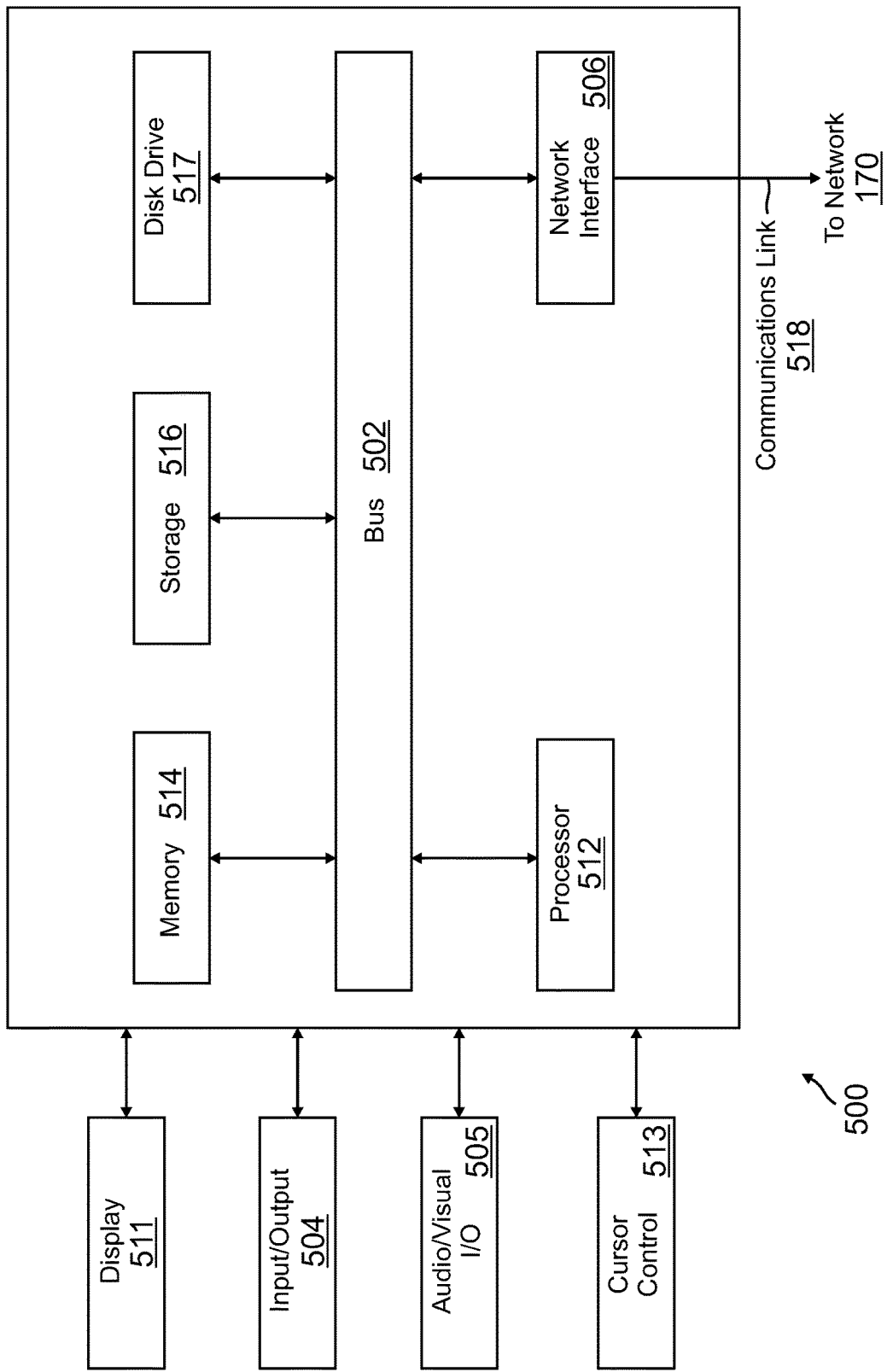
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example; floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system, comprising:
a non-transitory memory; and
one or more hardware processors coupled to the non-transitory memory and configured to read instructions from the non-transitory memory to cause the service provider system to perform operations comprising:
receiving preauthorization data comprising a set of criteria established by a user for an item, wherein at least one of the set of criteria is required to be met for a purchase of the item and wherein the item is a physical product;

determining at least one mandatory trigger causing the purchase of the item by the service provider system using the preauthorization data, wherein the at least one mandatory trigger causes the purchase of the item when purchase information for a transaction for the item meets the at least one of the set of criteria;

determining a final date for the purchase of the item based on the set of criteria, wherein the final date causes the purchase of the item without meeting the at least one mandatory trigger;

determining a plurality of online merchant marketplaces providing the item based on the set of criteria via a network connection with a plurality of servers, each of the plurality of servers associated with a different one of the plurality of online merchant marketplaces;

retrieving sales data from plurality of online merchant marketplaces prior to the final date;

determining whether the at least one mandatory trigger is met based on the sales data prior to the final date; and generating a purchase request for the item in the transaction in response to one of determining that the at least one mandatory trigger is met or a current date being the final date, wherein the purchase request is generated to minimize a cost for the purchase of the item based on the set of criteria.

2. The service provider system of claim 1, wherein the set of criteria comprises a first price, wherein the at least one mandatory trigger is determined using the first price.

3. The service provider system of claim 2, wherein the operations further comprise:

determining at least one optional criteria of the set of criteria, wherein the at least one optional criteria causes alerts based on the sales data, and wherein the at least one optional criteria comprises one of a second price higher than the first price, a discount amount, a price fluctuation amount or percentage, an inventory level, or a number of purchases.

4. The service provider system of claim 3, wherein the at least one optional trigger is determined based on the at least one optional criteria, and wherein the operations further comprise:

communicating the at least one optional trigger to a device for the user.

5. The service provider system of claim 4, wherein the operations further comprise:

determining that the at least one optional trigger is met; and communicating the determination that the at least on optional trigger is met to the device, wherein the purchase request is further generated based on receiving an authorization to process the purchase request for the item based on the at least one optional trigger.

6. The service provider system of claim 1, wherein the operations further comprise:

automatically processing the purchase request to provide a payment to a merchant offering the item for sale matching the purchase information without user consent.

7. The service provider system of claim 6, wherein the payment is provided using one of a credit extended to the user or a payment account with the service provider system.

8. The service provider system of claim 6, wherein prior to the determining the at least one mandatory trigger, the operations further comprise:

receiving an amount for the item to provide the payment to the merchant on establishment of the preauthorization data, wherein the amount is held by the service provider system for use in providing the payment.

9. The service provider system of claim 1, wherein the at least one mandatory trigger comprises a maximum price limit on the purchase request for the item.

10. The service provider system of claim 1, wherein the set of criteria comprises at least one of a purchase price for the item, an amount or percentage of a price change for the item, inventory levels for the item, a number of purchases of the item, a fluctuation amount of percentage in the number of purchases of the item, an amount in an account of the user, a percentage discount for purchase of the item, search results for the item, a number or percentage of online search engine searches for the item, news associated with the item, online postings and social networking trends associated with the item, or microblogging trends associated with the item.

11. The service provider system of claim 1, wherein the set of criteria comprises a number of purchases by other users associated with the user, and wherein the sales data comprises the number of purchases by the other users.

12. The service provider system of claim 11, wherein the operations further comprise:

alerting the user of the number of purchases by the other users.

13. The service provider system of claim 1, wherein prior to receiving the preauthorization data, the operations further comprise:

causing an application interface to be displayed on a device for the user, wherein the application interface comprises a plurality of menu options for establishment of the preauthorization data by the user.

14. The service provider system of claim 13, and wherein the plurality of menu options displayed in the application interface allow a selection of the item and an identification of the plurality of online merchant marketplaces selling the item.

15. A method comprising:

receiving preauthorization data comprising a set of criteria established by a user for an item, wherein at least one of the set of criteria is required to be met for a purchase of the item;

determining, by a service provider system that comprises one or more hardware processors coupled to a non-transitory memory, at least one mandatory trigger causing the purchase of the item by the service provider system using preauthorization data, wherein the at least one mandatory trigger causes the purchase of the item when purchase information for a transaction for the item is associated with the at least one of the set of criteria and wherein the item is a physical product;

determining a final date for the purchase of the item based on the set of criteria, wherein the final date causes the purchase of the item without meeting the at least one mandatory trigger;

determining a plurality of online merchant marketplaces providing the item based on the set of criteria via a network connection with a plurality of servers, each of the plurality of servers associated with a different one of the plurality of online merchant marketplaces;

retrieving sales data from plurality of online merchant marketplaces prior to the final date;

determining whether the at least one mandatory trigger is met based on the sales data prior to the final date; and generating a purchase request for the item in the transaction in response to one of determining that the at least one mandatory trigger is met or a current date being the final date, wherein the purchase request is generated to minimize a cost for the purchase of the item based on the set of criteria.

16. The method of claim 15, wherein the sales data comprises at least one of a price for the item, a discount for the item, a price change for the item, or an inventory level for the item.

17. The method of claim 15, further comprising:
determining additional information for the sales data, wherein the additional information comprises at least one of a time, search engine information associated with the item, social networking information associated with the item, or news associated with the item,
wherein the determining whether the at least on mandatory trigger is met is further based on the additional information.

18. The method of claim 15, wherein the retrieving the sales data comprises automatically pulling the sales data from web data associated with the plurality of online merchant marketplaces offering the item for sale.

19. The method of claim 18, wherein the web data for plurality of online merchant marketplaces is accessible through one of a device of another user, an online database, a search engine, an online news feed, a social networking resource, or a microblogging resource.

20. A non-transitory machine-readable medium having stored thereon machine-readable instructions executable to cause a machine to perform operations comprising:
receiving preauthorization data comprising a set of criteria established by a user for an item, wherein at least one of the set of criteria is required to be met for a purchase of the item and wherein the item is a physical product;
determining, by a service provider system that comprises one or more hardware processors coupled to a non-transitory memory, at least one mandatory trigger causing the purchase of the item by the service provider system using preauthorization data wherein the at least one mandatory trigger causes the purchase of the item when purchase information for a transaction for the item is associated with the at least one of the set of criteria;
determining a final date for the purchase of the item based on the set of criteria, wherein the final date causes the purchase of the item without meeting the at least one mandatory trigger;
determining a plurality of online merchant marketplaces providing the item based on the set of criteria via a network connection with a plurality of servers, each of the plurality of servers associated with a different one of the plurality of online merchant marketplaces;
retrieving sales data from plurality of online merchant marketplaces prior to the final date;
determining whether the at least one mandatory trigger is met based on the sales data prior to the final date; and
generating a purchase request for the item in the transaction in response to one of determining that the at least one mandatory trigger is met or a current date being the final date, wherein the purchase request is generated to minimize a cost for the purchase of the item based on the set of criteria.

* * * * *